INVENTOR.
Jan A. Rajchman
BY Morris L. Rubin
ATTORNEY.

INVENTOR.
Jan A. Rajchman
BY
Morris A. Rabkin
ATTORNEY.

NON-COINCIDENT MAGNETIC SWITCH

Filed Aug. 31, 1956 4 Sheets-Sheet 3

INVENTOR.
Jan A. Rajchman
BY
Morris ... [signature]
ATTORNEY.

April 3, 1962 J. A. RAJCHMAN 3,028,505

NON-COINCIDENT MAGNETIC SWITCH

Filed Aug. 31, 1956 4 Sheets-Sheet 4

INVENTOR.

Jan A. Rajchman

BY [signature]

ATTORNEY.

United States Patent Office 3,028,505

Patented Apr. 3, 1962

3,028,505

NON-COINCIDENT MAGNETIC SWITCH

Jan A. Rajchman, Princeton, N.J., assignor to Radio Corporation of America, a corporation of Delaware Filed Aug. 31, 1956, Ser. No. 607,440
19 Claims. (Cl. 307—88)

This invention relates to magnetic systems, and more particularly to magnetic systems capable of performing switching functions.

In certain of the prior-art magnetic switching systems, magnetic elements of material having non-linear magnetization characteristics are used. Such elements are employed advantageously in combinatorial-type switching systems described, for example, in an article entitled "Static Magnetic Matrix Memory and Switching Circuits," by Jan A. Rajchman, published in vol. XIII of the RCA Review, June 1952.

Heretofore, combinatorial-type systems have been of the coincident-current type; that is, a desired element is selected by concurrently applying excitations to a set of windings linked to the desired element.

An object of the present invention is to provide an improved magnetic switching system which retains the advantages of combinatorial-type systems without requiring coincident excitations.

Still another object of the present invention is to provide an improved magnetic switching system of potentially greater speed than prior switching systems.

A further object of the present invention is to provide an improved magnetic switching system that does not necessarily require a "rectangular-loop" material, but which will operate satisfactorily with magnetic material having appreciable remanence.

According to one form of the invention, the magnetic system includes a plurality of magnetic elements each having two remanent states of magnetization, and a plurality of outputs each linked to a different element and all of these outputs connected in parallel with each other. The circuit is arranged so that, when the state of magnetization of all of the elements is changed, no output signal is produced and, when the state of magnetization of less than all of the elements is changed, an output signal is produced. There may be coordinate groups of cores wherein any one core is located by activating coordinate conductors linked to that core.

Figure 1:
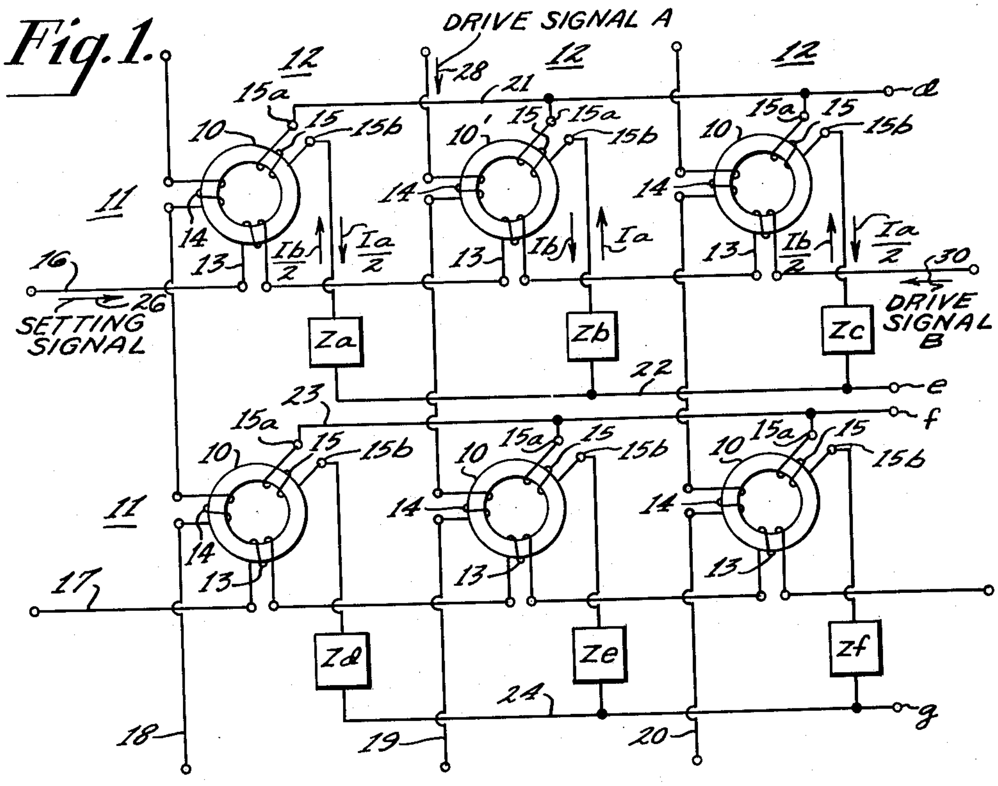
Figures 1A, 1B:
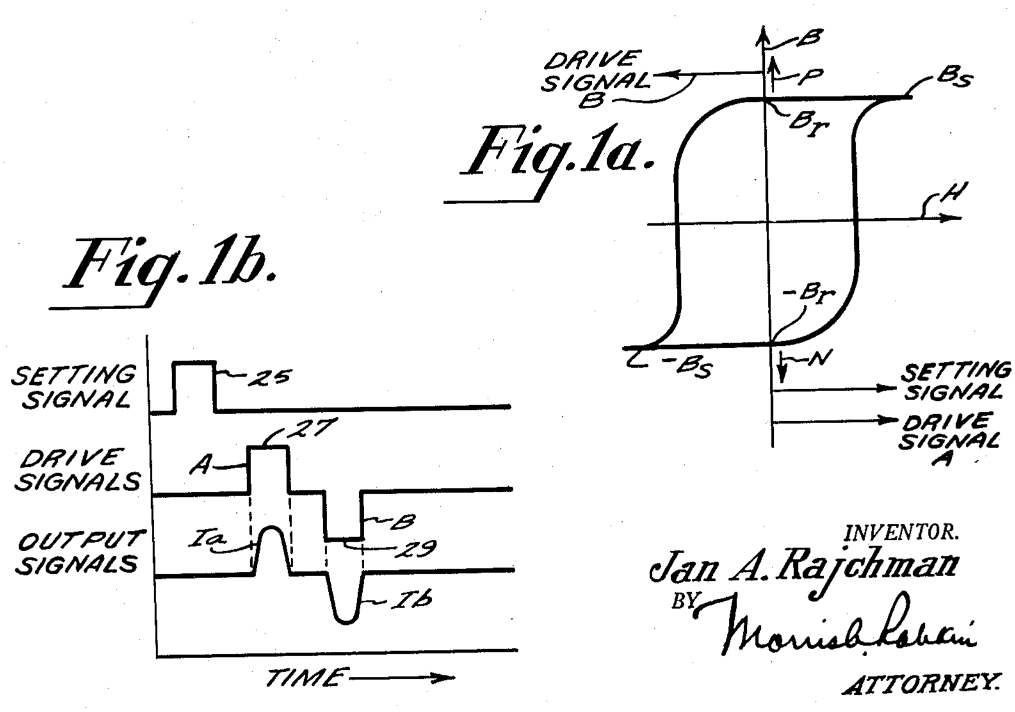
Figures 2, 2A:
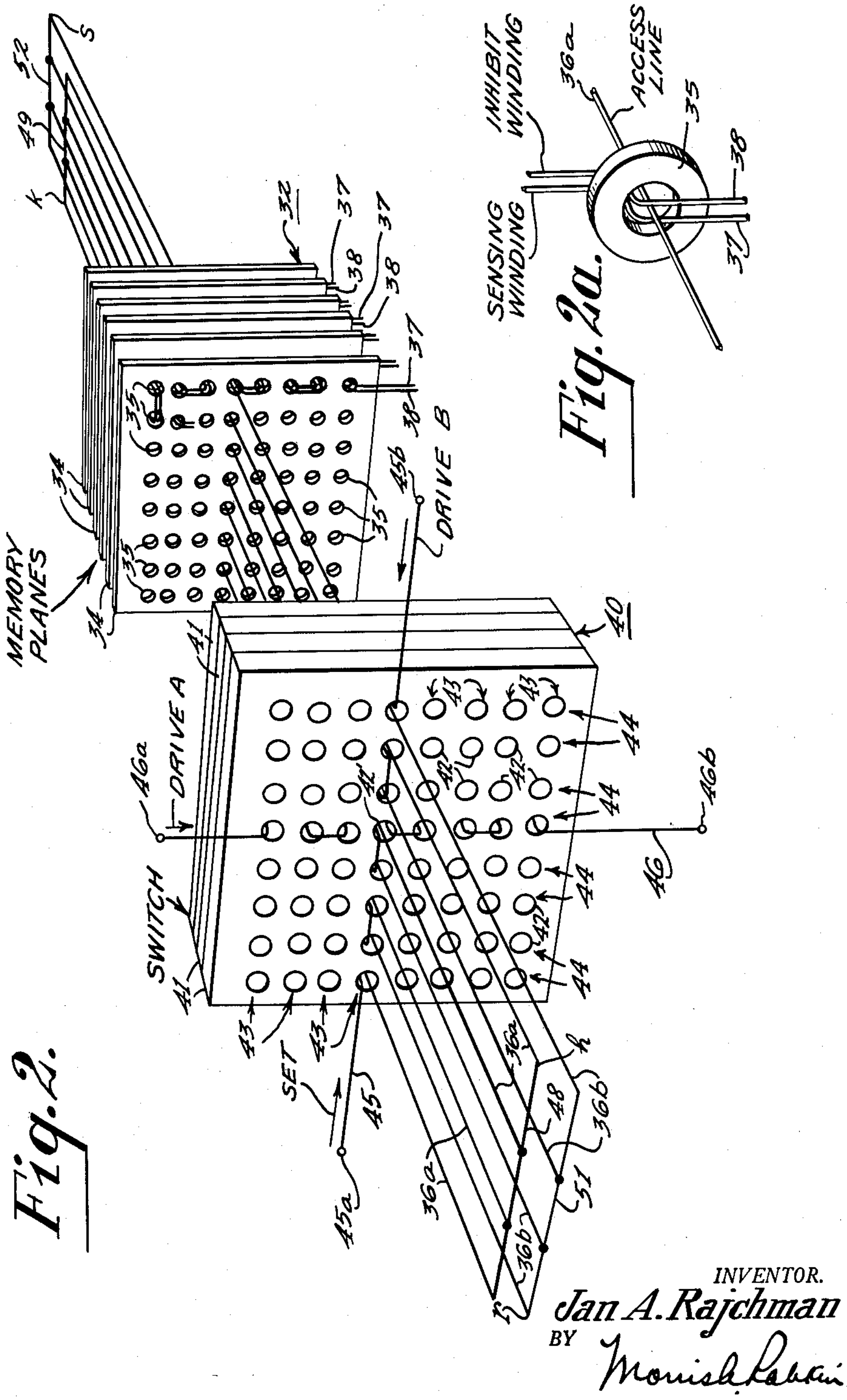
Figure 7:
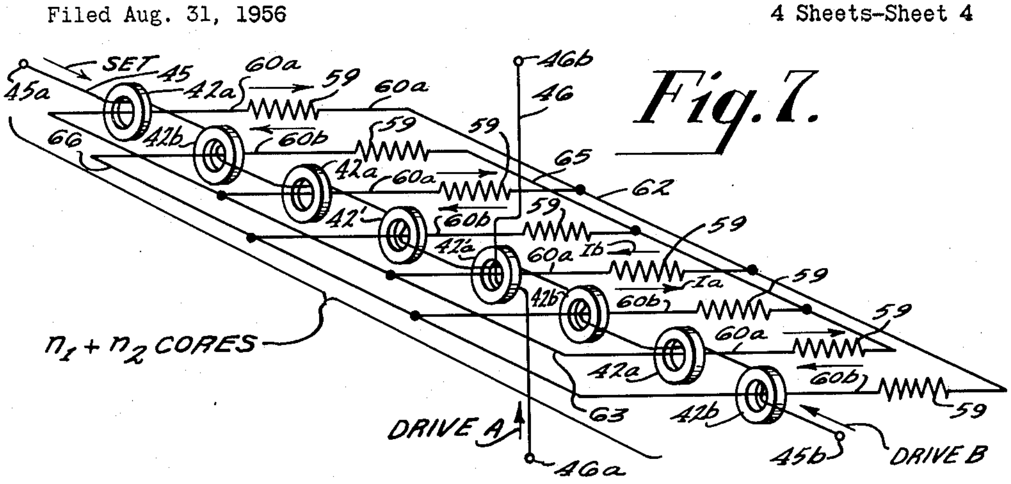
Figure 8:
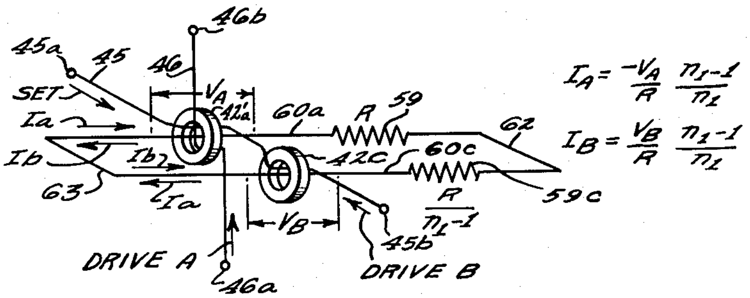
Figure 9:
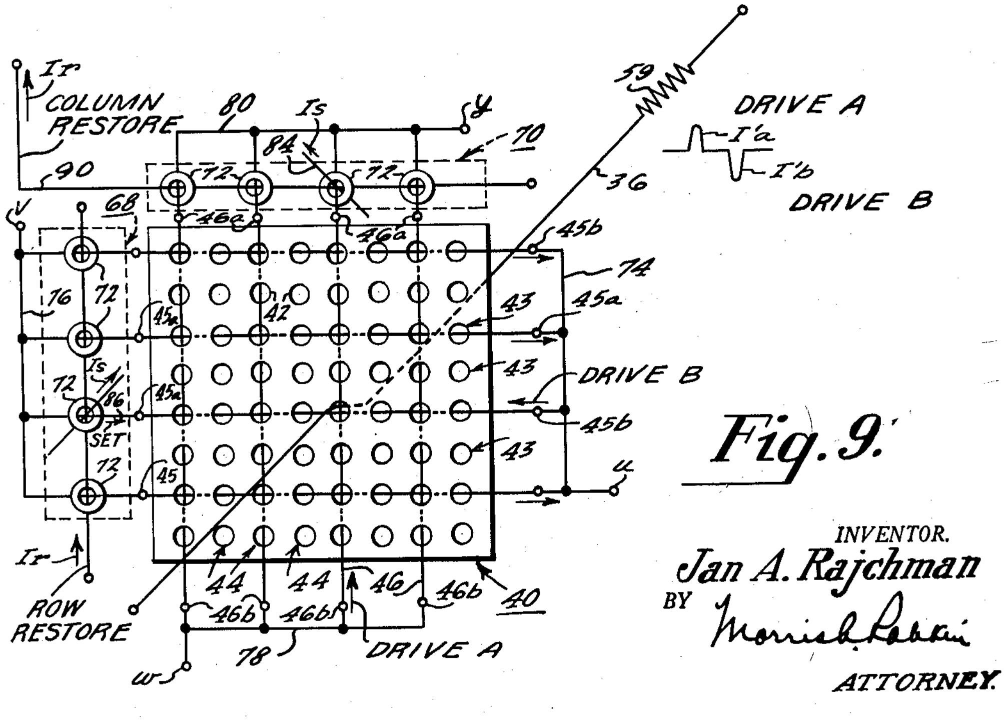

The invention will be more fully understood from the following detailed description when read in connection with the accompanying drawing wherein:

FIG. 1 is a schematic diagram of one embodiment of a switching system according to the invention;

FIG. 1*a* is a graph showing the hysteresis characteristic of one magnetic material suitable for carrying out the invention;

FIG. 1*b* is a timing diagram of waveforms useful in explaining the operation of the system of FIG. 1;

FIG. 2 is a schematic, perspective view of another embodiment of a system according to the invention, used in conjunction with a memory system;

FIG. 2*a* is a diagram of one of the memory cores of the system of FIG. 2, showing the windings coupled to that core;

FIGS. 3 through 6, respectively, are diagrams each illustrating the states of the switch elements of the system of FIG. 1 at different times during operation;

FIGS. 7 and 8 are equivalent circuits useful in explaining the operation of the system of FIG. 2, and FIG. 9 is a schematic diagram of another embodiment of the invention using a plurality of magnetic switches.

FIG. 1 shows a simplified form of a switching system according to the invention. It may be noted that the present invention generally is applicable to various types of switching circuits known in the art. Among these prior-art types are included, for example, combinatorial-type switches such as coding and encoding circuits, distributing circuits, commutating circuits, etc. The system of FIG. 1 illustratively has six magnetic elements 10 shown as toroidal-shaped cores. The six cores 10 are arranged in a matrix having two rows 11 and three columns 12. Each of the cores 10 is of a magnetic material having preferably, but not necessarily, a substantially rectangular hysteresis characteristic, as shown by the B—H curve of FIG. 1*a*. However, any magnetic material having appreciable remanence may be used, for example material having a $$\frac{Br}{Bs}$$

ratio of, say, approximately 0.6 or greater.

Each core 10 has two remanent states arbitrarily designated as the states P and N. In the state P, the core 10 has a remanent flux $Br$ and, in the state N, the core 10 has a remanent flux $-Br$. Each of the cores 10 of FIG. 1 is linked by a separate row winding 13, a separate column winding 14, and a separate output winding 15. A row coil 16 connects all the row windings 13 of the upper row 11 in series with each other, and another row coil 17 connects all the row windings 13 of the lower row 11 in series with each other. A first-column coil 18 connects the two column windings 14 of the first column 12 in series with each other; a second-column coil 19 connects the two column windings 14 of the second column of cores 10 in series with each other, and a third-column coil 20 connects the two column windings 14 of the third column of cores 10 in series with each other. Each of the cores 10 has a separate output circuit, including the output winding 15 of a core 10, and a load device. The three output windings 15 of the upper row 11 have their end terminals **15*a*** connected together to a common point *d* at a shorting conductor 21, and have their other end terminals **15*b*** connected respectively in series with three impedance elements $Za$, $Zb$ and $Zc$, representing separate load devices, to another common point *e* at a shorting conductor 22. The three output windings 15 of the lower row 11 have their end terminals **15*a*** connected together to a common point *f* at a shorting conductor 23, and have their other end terminals **15*b*** connected, respectively, in series with three impedance elements $Zd$, $Ze$ and $Zf$, representing three other, separate loads, to a common point *g* at a shorting conductor 24. The impedance elements $Za$ through $Zf$ each may be any suitable load device that is responsive to the output signals furnished by the switching system.

A desired one of the cores 10 may be selected by applying excitations sequentially to the one row and the one column coil linked to the desired core 10. The operating schedule for one cycle of excitations is indicated by the idealized waveforms of FIG. 1*b*. Each operating cycle comprises first applying a setting signal to the row coil linked to the desired core 10, and then successively applying a drive signal A to the column coil of the desired core 10, and thereafter a drive signal B to the row coil of the desired core 10. An output is produced in the output circuit of the selected core 10 both at the drive A and drive B times.

For example, assume that the desired core 10 (designated 10′ for convenience) is the one located at the intersection of the first row coil 16 and the second column coil 19. Initially, each of the cores 10 is at one of its two remanent states, for example, the state N. A setting signal, indicated by the current pulse 25 of the top waveform of FIG. 1*b*, is applied to the upper row coil 16 by any suitable source (not shown). The setting current of pulse 25 in the row coil 16 is represented by the arrow 26 which indicates, as do the other current-representing arrows adjacent conductors in the accompanying drawings, the direction of conventional current flow. The setting current generates a positive magnetizing force of sufficient amplitude to change all the cores 10 of the upper row 11 from the initial state N to the state P. The flux change in each of the cores 10 of the upper row 11 produces a voltage of approximately the same amplitude and of the same polarity in each of their output windings 15. Consequently, substantially no output current flows in any one of the output windings 15.

A drive signal A, indicated by the current pulse 27 of the middle waveform of FIG. 1*b*, is then applied to the second column coil 19. The drive signal A may be applied by any suitable excitation source (not shown). The drive signal A current flowing in the second column coil 19 is represented by the arrow 28, and changes the desired core 10′ from the set state P to the initial state N. The other core 10 linked by the second column coil 19 is driven further into saturation in its initial state N, and relatively little flux change is produced in this other core 10 by the drive signal A. However, a relatively large flux change is produced in the desired core 10′ in changing from the state P to the state N. This flux change produces a relatively large voltage in its output winding 15 and causes a relatively large output current I*a* to flow through the connected impedance Z*b*. The output current I*a* flows from the terminal 15*a* of the output winding 15 of the core 10′ to the upper shorting conductor 21 and then divides substantially evenly, and a current $$\frac{Ia}{2}$$

flows through the other two impedances Z*a* and Z*c* that are connected to the other two output windings 15 of the upper row 11. Both the currents $$\frac{Ia}{2}$$

return through the lower shorting conductor 22 and through the impedance element Z*b* to the terminal 15*b* of the output winding 15 of the selected core 10′. In practice, any number "*n*" of impedance elements may be connected across the common points *d* and *e* so that a relatively small portion $$\frac{Ia}{n-1}$$

of the output current flows in any one of the non-selected impedance elements.

A drive signal B, indicated by the current pulse 29 of the middle waveform of FIG. 1*b*, is next applied to the row coil 16. The current of drive signal B is represented by the arrow 30, and generates a negative magnetizing force sufficient to change each of the cores 10 of the upper row from the state P back to the initial state N. This magnetizing force returns the two end cores 10 of the upper row to the state N and drives the desired core 10′ into saturation in the state N. Thus, the drive signal B produces a relatively large flux change in the two end cores 10 of the upper row and a relatively small flux change in the desired core 10′. A relatively large output voltage is produced across each of the two output windings 15 of the two end cores 10. Each of these output voltages causes an output current designated $$\frac{Ib}{2}$$

These currents flow from the terminals 15*a* of the output windings 15 of the two end cores 10 to the upper shorting conductor 21. Then, both currents combine and the combined current I*b* flows through the output winding 15 of the desired core 10′ and the impedance element Z*b* to the lower shorting conductor 22. Then, the current I*b* divides and the two currents $$\frac{Ib}{2}$$

each returns to the terminals 15*b* of the output windings 15 of the two end cores 10. The output current I*b* flowing in the output circuit of the desired core 10′ is opposite in polarity from the output current I*a*. As described hereinafter, these two opposite-polarity outputs can be made of the same amplitude, if desired. Any other desired one of the cores 10 can be selected in like manner to produce the opposite-polarity currents I*a* and I*b* in its output circuit. The two opposite-polarity outputs I*a* and I*b* are indicated in the bottom waveform of FIG. 1*b*.

An embodiment of the invention in conjunction with a memory system is shown in FIG. 2 wherein a memory system 31 has an array 32 of two-dimensional memory planes 34. Each memory plane 34 has, by way of example, a matrix of eight rows and eight columns of memory elements 35, each aligned with the corresponding elements of each memory plane 34. A different binary digit of a five-digit character may be stored in a corresponding aligned memory element of each of the five memory planes 34. The memory elements 35 of the memory planes 34 may be individual rectangular hysteresis loop cores embedded in a non-magnetic retaining medium. Such memory-plane construction is described in more detail in a copending application Serial No. 375,470, entitled "Memory System" and filed by the present applicant and Richard O. Endres on August 20, 1953, now Patent No. 2,784,391, issued March 5, 1957. As an alternative, each of the memory planes 34 may be a plate of substantially rectangular hysteresis loop material having an array of apertures therein, where the portion of material about each different aperture defines a different memory core 35. Thus, each different coordinate position of the memory planes 34 corresponds to a different group of five aligned memory cores 35 of the array 34 and a different storage position for a character.

All the aligned cores 35 of a character group are linked by a different access line 36. Only the group of access lines 36 for one of the rows of aligned memory cores 35 of the memory planes 34 is shown. However, each of the other rows of memory cores 35 may be linked by a similar group of access lines 36 (not shown). Each different memory plane 34 also may have a sensing winding 37 and a separate inhibit winding 38 (only partially indicated in FIG. 2) linking all of its memory cores 35. The access lines 36 and the sensing windings 37 may be used jointly for reading information out of, and the access lines 36 and the inhibit windings 38 may be used jointly for reading information into, a desired group of the memory cores 35. FIG. 2*a* shows one of the memory cores 35 and the manner of linking an access line 36, a sensing winding 37 and an inhibit winding 38 to that one core 35, abstracted from its memory plane 34. The core 35 is shown somewhat enlarged for convenience of illustration.

Signals are applied to desired ones of the access lines 36 of the memory planes 34 under the control of a magnetic switch 40. The switch 40 has four separate arrays 41 each having a plurality of magnetic elements 42. Eight rows 43 and eight columns 44 of the magnetic elements 42 are arrayed similarly to the eight rows and eight columns of the memory planes 34. Each switch element 42 is aligned with a corresponding one of the group of memory cores 35 located in corresponding positions in the memory array 32. The separate access lines 36 constitute the output windings of separate ones of the switch elements 42. Each of the rows 43 of the elements 42 of the switch 40 has a separate row excitation means, for example, a row winding 45, and each of the columns 44 of the elements 42 of the switch 40 has a separate column excitation means, for example, a column winding 46. Each of the switch elements 42 is linked by a different pair of the row and column windings 45 and 46. For convenience of drawing, only one pair of the row and the column windings is shown. The switch elements 42 may consist of individual magnetic cores embedded in non-magnetic retaining material. As an alternative, each of the arrays 41 of the switch 40 may be an apertured plate of magnetic material, as shown, wherein the portion of material about each different one of the apertures defines a different magnetic element 42. Four separate arrays 41 are shown for illustrative purposes. It is understood, however, that any suitable single array having magnetic switch elements may be used in place of the separate arrays 41. The row and column windings 45 and 46 are linked to different groups of elements 42 in known "checkerboard" fashion; that is, the sense of linkage of an excitation means alternately reverses in successive ones of the elements 42. A "checkerboard" winding arrangement is described in the above-mentioned Patent No. 2,784,391, and in Patent No. 2,691,154 issued to the present applicant on October 5, 1954. The sensing and the inhibit windings 37 and 38 of the memory planes 34 also may be "checkerboarded" in like manner. It is understood that while "checkerboarding" provides advantages, it is not necessary in carrying out the present invention. Also, other known arrangements of excitation windings to link different groups of magnetic elements in combinatorial fashion may be employed, if desired.

An arrangement and the operation of a memory system similar to that of FIG. 2, with the exception of the connections of the access lines 36 and of the arrangement of the magnetic switch 40, is described in aforesaid Patent No. 2,784,391.

In the system of FIG. 2, alternate ones of the row of access lines 36 are connected in parallel with each other in two separate groups. One of the groups includes the four access lines 36a which link odd-numbered (counting from the left in FIG. 2) elements 42 of a row 43, and the other group includes four access lines 36b which link the even-numbered (counting from the left in FIG. 2) elements 42 of a row 43. All the access lines 36a are connected in parallel with each other across first and second junction points *h*, *k* by the shorting conductors 48 and 49 respectively located at the near side of the switch 40 and the far side of the memory array 32. Similarly, all the access lines 36b are connected in parallel with each other across two other junction points *r*, *s* by the shorting conductors 51 and 52 respectively located at the near side of the switch 40 and the far side of the memory array 32.

The arrangement of the system of FIG. 2 effectively provides two interlaced systems with half of the switch elements 42 and their aligned memory cores 35 being part of one system, and the other half of the switch elements 42 and their aligned memory cores 35 being part of the other system. The row and column windings 45 and 46 of the switch 40, and the sensing and inhibit windings 37 and 38 of the memory array, are each common to both systems.

In an arrangement where "checkerboarding" is not used, all the access lines 36 may be connected in parallel with each other across two junction points.

Figure 3:
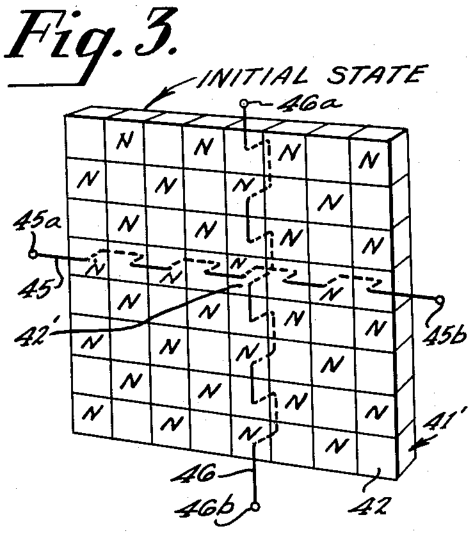
Figure 4:
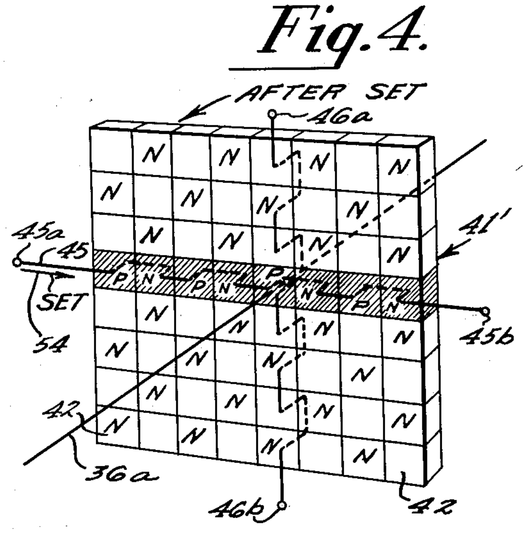
Figures 5, 6:
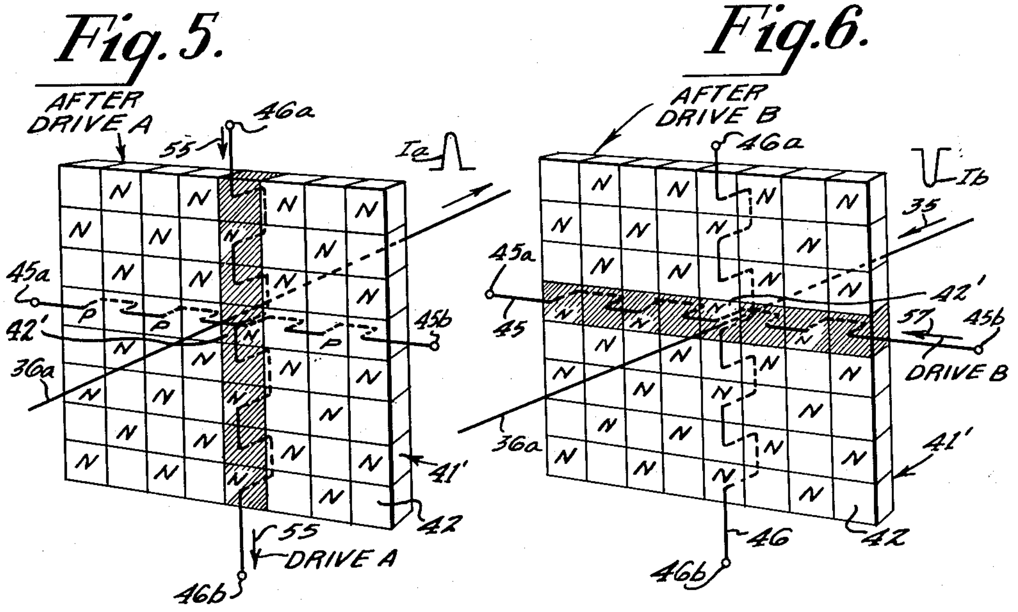

In operation, each of the switch elements 42 is initially in one of the two remanent states N and P. Because the row and column windings 45 and 46 are linked to the elements 42 in "checkerboard" fashion, half of the switch elements 42 are initially in the state N and half are initially in the state P. Each of the switch elements 42 that is initially in the state N is illustrated in FIG. 3 by the letter "N" inscribed in the box located in a corresponding position in the array 41'. The unmarked boxes in FIG. 3 represent switch elements 42 that are initially in the state P. The latter boxes are not marked "P" in the drawings in order to facilitate visualizing changed states of certain of the original "N" state elements 42, as shown in FIGS. 4 and 5. Attention may be fixed on the row and column of elements for which, in FIG. 3, the windings 45 and 46 are specifically shown.

A desired one 42' of the switch elements 42 may be selected as follows: (1) Apply a setting signal to change all the switch elements 42 of the row 43 that includes the desired element 42' from their respective initial states to their respective other states: (2) Apply a column drive signal A to all the elements 42 of the column 44 that includes the desired element 42' in a direction to drive each to its initial state, and (3) Apply a row drive signal B to all the elements 42 of the previously driven row 43 in a direction to drive each element from its other state to its initial state.

The states of the switch elements 42, after the setting signal is applied to the terminal 45*a* of the row winding 45 of the fourth row, is indicated in the diagram of FIG. 4. The setting current flowing in the row winding 45 is indicated by the arrow 54. The setting current changes each of the switch elements 42 of the row that is initially in the state N to the state P, and each of the switch elements 32 of the row that is initially in the state P to the state N. Substantially no output is produced in any of the access lines 36, as a result of the application of the setting signal, because each of the changed switch elements 42 produces a substantially equal voltage of the same polarity across the terminals of its coupled access line 36. Thus, any voltage induced in an access line 36*a* or 36*b* is substantially equal to and of the same polarity as any other voltage induced in another access line 36*a* or 36*b*.

The states of the switch elements 42, following the application of the column drive signal A to the terminal 46*a* of the column winding 46, is indicated in FIG. 5. The column drive signal A current flowing in the column winding 46 is represented by the arrow 55. The drive signal A current changes the desired switch element 42' from the state P to the state N. Each of the remaining switch elements 42 of the column 44, linked by the column winding 46, is driven further into saturation in its initial state N or P. An output signal is produced only in the one access line 36*a* coupled to the desired switch element 42'. This output signal is of one polarity, for example, as indicated by the positive-going current pulse I*a*. The pulse I*a* flows from one terminal of the access line 36*a* of the desired element 42' through the line of memory cores 35 (FIG. 2) corresponding to the address of the desired switch element 42', to the shorting conductor 49, then the current I*a* divides between the other three access lines 36*a* of the group of four access lines 36*a*, and returns through these three access lines 36*a* and through the shorting conductor 48 to the other terminal of the access line 36*a* of the desired element 42'. The output signal I*a* may be of sufficient amplitude to change each of the memory cores 35 receiving that signal I*a* from one state to the other state of magnetization. Thus, the signal I*a* may be used, for example, for reading out the information stored in a character group of memory cores 35 by observing any resultant voltages induced in the separate sensing windings 37 coupled to memory cores 35 of the separate memory planes 34. The portions of the current I*a* that flow in the other three access lines 36*a* of the group are each of insufficient amplitude to produce any appreciable flux change in a memory core 35 threaded by any one of these access lines.

The column drive signal A causes a "noise" voltage to be induced in the access lines 36*a* as the remaining switch elements 42 are driven further into saturation. Each of the "noise" voltages is of relatively small amplitude when compared with the desired output signal I*a* of the desired switch element 42'. The amplitude of any one of the "noise" signals is insufficient to change the state of magnetization of any of the memory cores 38. A similar "noise" signal is found in previously known magnetic switches of the combinatorial type. If desired, known compensation techniques may be used for reducing or cancelling the "noise" signals induced in the access lines 36 of the memory system during the column drive signal A.

The state of the switch elements 42, after the application of the row drive signal B to the terminal 45*b* of row winding 45, is indicated in the diagram of FIG. 6. The drive signal B current flowing in the row winding 45 is represented by the arrow 57 adjacent the row winding 45. Thus, the row drive signal B returns all of the switch elements 42 of the fourth row to their initial state, except the selected element 42′ already in the state N. The four elements that are returned to their initial state P each produces a like polarity voltage of substantially the same amplitude across its access line 36*b* and there is no resultant current flow in any of the access lines 36*b*. The desired element 42′ at the intersection of the row and column windings 45 and 46 is driven further into saturation in the state N. The individual output currents produced by the three elements 42 that are returned to the state N by the row drive signal B flow through the parallel-connected access lines 36*a* and all combine in the access line 36*a* of the desired element 42′. The combined output signal is indicated in FIG. 6 by the negative-going current pulse designated I*b* in the access line 36*a*. The output signal I*b* may be used for writing information into the line of memory cores 35 (FIG. 2) that are coupled to the access line 36*a* carrying the output signal I*b*. Either a binary one or a binary zero may be written into selected cores of the selected line of memory cores 35; for example, a binary zero may be written into selected ones of these memory cores 35 by applying concurrently with the output signal I*b* an inhibit current to the inhibit windings 38 of these memory cores 35. A binary one may be written into selected ones of these memory cores 35 by withholding the inhibit current from the inhibit windings 38 of these memory cores 35.

FIG. 7 shows a circuit for a group $(n_1+n_2)$ of magnetic elements 42, including a row winding 45 and one of the column windings 46, and a group of a like number of load devices indicated by the resistance elements 59. A load device 59 may be, for example, a group of aligned memory cores 35 of the memory array 32 of FIG. 2. The elements 42 (FIG. 7) are divided into two groups. One group includes the $n_1$ elements 42*a* and the other group includes the $n_2$ elements 42*b*. Each output winding 60*a* and its series-connected load device 59 of the first group $n_1$ of the cores 42 are all connected in parallel across the shorting conductors 62 and 63. Each output winding 60*b* and its series-connected load device 59 of the second group $n_2$ of the cores 42*b* are all connected in parallel across the shorting conductors 65 and 66.

During the setting operation, all of the elements 42*a* are changed from the state N to the state P by the setting signal applied to the row winding 45. A voltage of the same polarity and of approximately the same amplitude is induced across the terminals of each of the output windings 60*a* due to the flux changes in the elements 42*a*, and substantially no output current flows in any of the output windings 60*a* and their load devices 59. The same setting signal drives each of the elements 42*b* from the state P to the state N. Another voltage of the opposite polarity and of substantially the same amplitude is induced across the terminals of all the output windings 60*b* due to the flux changes in the elements 42*b*. Substantially no load current is produced in any of the output windings 60*b* and their load devices 59 as a result of the application of a setting signal. The column excitation means (not shown) which activates any column winding 46 (only one of which is specifically shown in FIG. 7) may be open-circuited during the time that a signal (setting or drive) is applied to the row windings 45. Thus, substantially no current flows in the column windings 46 as a result of application of signals to a row winding 45. Similarly, the row excitation means (not shown) that activate the row winding 45 may be open-circuited during the time that signals are applied to the column winding 46. The absence of induced current during the setting operation implies that the setting of a group of switch elements 42 may be carried out with great speed. Therefore, substantially the only limitation on the speed of the setting operation resides in the characteristics of the magnetic material used in making the elements 42.

When the column drive signal A is applied to the column winding 46, the coupled element 42, for example the element 42′*a* linked thereby, is driven from one state, say the state P, to the other state N. The flux change in this element 42′*a* induces a voltage in its output winding 60*a*. A current I*a* flows from one end terminal of this output winding 60*a* and through its coupled load 59 to the conductor 62. The current I*a* then divides substantially evenly between the other three access lines 60*a* of the group $n_1$ and returns through their three loads 59 and through the conductor 63 to the other end terminal of the output winding 60*a*.

FIG. 8 shows a simplified equivalent circuit which may be used to provide a simple explanation of the operation of the arrangement of FIG. 7. In FIG. 8 the $(n_1-1)$ parallel paths 60*a* are lumped in the single path 60*c*. The load 59*c*, connected in the path 60*c*, has an equivalent impedance equal to a value of $$\frac{R}{n_1-1}$$

equal to the equivalent impedance of the parallel loads 59 of FIG. 7 through which the current I*a* divides. The element 42*c*, coupled to the load 59*c*, is used to represent any one of the $(n_1-1)$ parallel-coupled elements 42*a* of FIG. 7. The two loads 59 and 59*c*, and the two windings 60*a* and 60*c*, are connected in parallel with each other across the conductors 62 and 63. The setting signal applied to the winding 45 changes both the elements 42*a* and 42*c* from the state N to the state P. Thus, at each instant during the switching of the cores 42*a* and 42*c*, equal amplitude voltages of the same polarity are induced across the conductors 62 and 63 and no resultant current flows.

When the drive signal A is applied to the column winding 46, the core 42*a* is changed from the state P to the state N, and a voltage $V_A$ is induced in its output winding 60*a*. The resultant current I*a* flowing in the equivalent circuit of FIG. 8 is equal to $$I_A=\frac{-V_A}{R}\,\frac{n_1-1}{n_1} \qquad (1)$$

The non-selected loads 59*c*, coupled to an output winding 60*a*, each have a current equal to $$\frac{Ia}{n_1-1}$$

The currents in the non-selected loads 59*c* are insufficient to produce any appreciable change in the condition of a non-selected load element 59*c*.

Application of a row drive signal B to the row winding 45 returns the $(n_1-1)$ elements, represented by the element 42*c*, from the state P to the state N and drives the element 42*a* further into saturation in the state N. The flux change in the element 42*c* induces a voltage $V_B$ in the output winding 60*c*, thereby generating a current, $$Ib=\frac{-V_B}{R}\,\frac{n_1-1}{n_1} \qquad (2)$$

in the equivalent circuit of FIG. 8. The current I*b* flows through the output winding 60*a* of the desired element 42*a* and its connected load element 59.

Similarly, in the circuit of FIG. 7 the row drive signal B returns the $n_1-1$ cores 42*a* to the state N, thereby producing the opposite polarity output current I*b* in the output circuit of the desired core 42'*a*. The row drive signal B also returns each of the group $n_2$ of the cores 42*b* from the set state N to the initial state P. However, substantially no output current flows in any of the output windings 60*b* of the cores 42*b* because of the substantially equal voltages induced in each of their output windings 60*b*.

If the voltage $V_B$ is made equal to the voltage $V_A$, as by adjusting the rate of switching the flux of the $(n_1-1)$ elements 42*a* of FIG. 7, then the current I*b* is equal to the current I*a* but of opposite polarity (with reference to its magnetic effect on the core). The voltages $V_A$ and $V_B$ can be adjusted at will since the column drive signal A and the row drive signal B currents rise times and amplitudes can be varied at will to independently adjust the amplitude of voltages $V_A$ and $V_B$ produced during the respective drive operations.

The amount of output current I*a* or I*b* can be made substantially independent of the impedances of the memory cores 35 (FIG. 2) by providing an additional series impedance (not shown) for each different one of the access lines of the memory array 32. The additional series impedances each has a value greater than that of the impedance of any one of the access lines 36 during the switching of the memory cores 35 receiving an output current I*a* or I*b*.

The excitation means for the switch array 40 (FIG. 2) may be provided by any known means, such as the two further magnetic switches, as in the embodiment of FIG. 9. A first magnetic switch 68 may be used for supplying the row excitation signals, and a second magnetic switch 70 may be used for supplying the column excitation signals. Each of the magnetic switches 68 and 70 may be arranged similarly to the magnetic switch shown in FIG. 1 of Patent No. 2,734,182 issued February 7, 1956, to the present applicant. For convenience of drawing, only half of the switch cores 72 of the row and column switches 68 and 70 and their respective output windings are shown in FIG. 9, alternate switch cores of the row and column switches being omitted. The omitted row and column switch cores are similar to those shown. One end terminal of each of the output windings of the row switch 68 is connected to the terminal 45*a* of a different one of the row windings 45. The other end terminals 45*b* of all the row windings 45 are connected together to a junction point *u* at the shorting conductor 74. The first and second junctions (not shown in FIG. 9) are like those in FIG. 2. The other end terminals of all the output windings of the row switch 68 are connected together to another junction point *v* at the shorting conductor 76. Similarly, each of the output windings of the column switch 70 is connected in series with a different one of the column windings 46 of the switch array 40; and each combination of a column switch output winding and a column winding 46 is connected in parallel with the other across the pair of junction points *w* and *y* at the shorting conductors 78 and 80. For arrays larger than the exemplary switch array 40, the row and column switches 68 and 70 (such as those described in the above-mentioned Rajchman patent) may consist of a pyramid of combinatorial switches each driving a succeeding one of a greater number of cores.

The operating schedule for the embodiment of FIG. 9 may be similar to that described for the embodiment of FIG. 2. The row setting signal and the drive B signals are applied to a desired row winding 45 by driving that switch core 72' of the row switch 68 whose output winding is connected thereto between the states N and P, and P and N, respectively. The drive B signal is applied to a desired column winding 46 by driving that switch core

72" of the column switch 70 whose output winding is connected thereto between the states N and P.

Any of the switch cores 72 of the row and column switches 68 and 70 are selected, in known fashion, by applying signals to a set of selecting windings linked to the desired core, as described in the Rajchman Patent No. 2,734,182 referred to above. For simplicity of drawing and convenience of explanation, the set of selecting windings for the row switch 68 and the column switch 70 are all represented by a single selecting winding 82 linked to the desired core 72' of the row switch 68, and the single selecting winding 84 linked to the desired core 72" of the column switch 70.

A selecting current applied to the selecting winding 82 drives the desired switch core 72' from the state N, for example, to the state P. A setting current, represented by the arrow 86, then flows in the row winding 45 that is linked to the desired switch element 42'. Alternate ones of the switch elements 42 of the row 43 receive the setting current and are driven from the initial states N and P, respectively, to the states P and N. Because of the division of the setting current among the remaining row windings 45, only the switch elements 42 of the selected row 43 have any appreciable flux change produced therein due to the setting current. Substantially equal voltages of the same polarity are induced across the shorting conductors 78 and 80 due to the flux changes in the odd-numbered ones of the switch elements 42 of the row receiving the setting current. Hence, no current is induced in any of the column windings 46 for the same reason that there are no load currents as described, for example, in connection with FIG. 2.

A column drive signal A is then applied to the column winding 46, coupled to the desired switch element 42', by changing the core 72" of the column switch 70 from the state N to the state P. The flux change in the core 72" of the column switch 70 produces a column drive signal A in the column winding 46 coupled thereto. The column drive signal A changes the desired switch element 42' from the set state P to the state N, thereby producing an output current I*a* in the coupled access line 36. The output current I*a* divides between the remaining access lines 36, of the same group of access lines, in the manner described for the embodiment of FIG. 2. Thus, only the one character group of the memory array 32 receives an appreciable excitation signal.

The row winding 45, coupled to the changed switch element 42', also has a voltage induced therein. This induced voltage is in a direction to make the row winding terminal 45*b* more positive than its terminal 45*a*. The resultant current flow in the row windings 45 is in a direction to change the previously driven switch core 72' of the row switch 68 from the state P to the state N. However, the amplitude of the resultant current flow is insufficient to actually change the state of the switch core 72' because of the relatively high, cumulative impedance offered by the switch elements 42. Accordingly, the impedance offered by the load device 59 connected to the access line 36 is relatively small compared to the impedance offered by the row windings 45, and the same generated voltage is applied in each case. Therefore, most of the column drive signal A energy is transmitted to the desired load 59 connected in the access line 36 of the selected switch element 42'. Furthermore, if necessary, the column drive signal A can be adjusted so that the resultant signal induced in the row winding 45 by driving the selected switch element 42' is insufficient to change the state of the previously driven row switch core 72' or of any other of the switch cores 72 of the row switch 68. Also, if necessary or desirable, a separate impedance element can be connected in series with each of the row windings 45 to limit the current flow therein during the column drive signal A. In addition, some flux change is permissible in the row switch core 72' as long as sufficient flux is retained to furnish the subsequent row drive signal B when the row switch core 72′ is returned to its initial state N.

After the drive signal A is terminated, the previously driven switch core 72′ of the row switch 68 is returned from the state P to the state N by applying a restore signal Ir to a coil 88 that is coupled to all of the switch cores 72 of the row switch 68. The previously changed switch core 72′ is thus returned to the state N. The flux change produced in the switch core 72′ produces a row drive signal B current in the row winding 45 linked to the desired switch element 42′. The row drive signal B current returns the remaining ones of the previously changed switch elements 42 of the selected row 43 back to their respective initial states. The three elements 42 that are changed to the state N cause an opposite-polarity ouput current Ib in the access line 36 coupled to the desired switch element 42′, as described above in connection with FIG. 2. No current flows in the other access lines 36 when the other four elements 42 of the selected row 43 are returned to their initial state P. The flux changes in the aforementioned three switch elements 42 also induce voltages in the respective column windings 46 coupled to these three switch elements 42. These induced voltages cause a voltage difference between the conductors 80 and 72, thereby causing a current to flow in the previously selected column winding 46. This current flow is in a direction to restore the previously-driven core 72″ of the column switch 70 to the state N. Accordingly, if desired, a restore signal Ir can be applied to the restore coil 90 of the column switch 70 at the same time as the row drive signal B is applied to the row winding 45 of the desired switch element 42′. Thus, upon the termination of the row drive signal B, each of the switch elements 42 and each of the switch cores 72 of the row and column switches 68 and 70 are in their initial states. Another, or the same, switch element 42 of the array 40 can be selected by initiating a new cycle of set, column drive signal A, and row drive signal B.

Coincident-current techniques, such as are described in the copending application filed by Jan A. Rajchman on May 26, 1953, Serial No. 357,403, entitled "Magnetic Switch Assembly," may be used for selecting a desired row of elements of the array 3. Thus, each row of elements 11 may be linked by a separate one of a plurality of selecting windings. Different groups of these row windings are connected in series in combinatorial fashion in sets. A desired one of the rows of elements 11 is then selected by concurrently applying excitations to one of the groups of windings in each of the sets.

Also, known coincident-current techniques may be used for selecting a group of switch elements 42 in one of the rows 43 so as to reduce the amount of power required for operating the system.

Other arrays than the square array illustrated may be employed in a similar manner, if desired. For example, rectangular arrays, hexagonal arrays, or other desired geometrical arrays may be used.

There have been described herein improved magnetic switching systems which retain the advantages of combinatorial-type switching systems without requiring coincident excitations. Further, it is not necessary for the magnetic elements used in the described systems to have substantially rectangular hysteresis characteristics. All that is required is that the magnetic elements have appreciable remanence. The amplitude of any of the drive signals used in operating the described systems is essentially unlimited, thereby permitting relatively high operating speeds.

What is claimed is:

1. A magnetic system comprising a plurality of magnetic elements, each having two states of magnetization and each requiring a threshold excitation before changing from one to the other of said two states, means for selecting one of said elements comprising means for applying a first excitation to all said elements in a direction to change all said elements to said other state, means for applying to said one element and not others of said elements a second excitation in a direction to change said one element from said other to said one state, and means for applying a third excitation to all said elements in a direction to change the remaining ones of said elements from said other to said one state.

2. In a magnetic system, the combination of a plurality of individual magnetic cores, each said core having two states of magnetization and each requiring a threshold excitation before changing from one to the other of said two states, means for selecting one of said cores comprising means for applying a first excitation to all said cores in a direction to change all said cores to said other state, means for applying to said one core and not others of said cores a second excitation in a direction to change said one core from said other to said one state and means for applying a third excitation to all said cores to change the remaining ones of said cores from said other to said one state.

3. A magnetic system comprising a plate of magnetic material having therein a plurality of apertures, the material about each different one of said apertures defining a different magnetic element, each said element having two states of magnetization and each requiring a threshold excitation before changing from one to the other of said two states, means for selecting one of said elements comprising means for applying a first excitation in a direction to all said elements to change all said elements to said other state, means for applying to said one element and not others of said elements a second excitation in a direction to change said one element from said other to said one state, and means for applying a third excitation to all said elements in a direction to change the remaining ones of said elements from said other to said one state.

4. In a magnetic system, the combination of a plurality of magnetic elements each having two remanent states, a plurality of output windings each linked to a different one of said elements, and an output circuit including an output load in series with said output windings, means providing (1) a return path for current induced in the output winding of one of said elements through the output windings of others of said elements and through said load when said one element is selectively changed from one of said remanent states to the other of said states, and (2) providing a return path for output currents induced in said output windings of said other elements through the output winding of said one element when said other elements are changed from the one to the other of said remanent states, and means for applying an excitation signal in a direction to change all of said other elements to said other of said remanent states after said one element is selectively changed to said other of said remanent states.

5. A magnetic system comprising a plurality of magnetic elements each having two states of magnetization, a plurality of outputs each linking a different one of said elements, said outputs of certain of said elements being connected in parallel with each other, a plurality of output loads individually connected in series with said plurality of outputs, a first excitation means linking all said certain elements, a second excitation means linking others of said elements including one of said certain elements, and means for selecting said one element comprising means for applying in sequence a first excitation to said first excitation means in a direction to change all said certain elements from one to the other of said two states, and means for applying a second excitation to said second excitation means in a direction to change said one element from said other to said one state.

6. In a magnetic switching system, the combination of a plurality of magnetic elements each capable of assuming stable remanence conditions, a plurality of output windings, each of said output windings being linked to a different one of said elements, first and second junction points, all of the output windings of said elements being connected in parallel with each other between said first and second junction points, a first winding means linked to all of said elements, a plurality of second winding means each being linked to a different one of said elements, and means for selecting a desired one of said elements comprising means to apply in sequence a first excitation of one polarity to said first winding means, a second excitation to that one of said second winding means linked to said desired element, and a third excitation of the polarity opposite said one polarity to said first winding means, whereby substantially no output signal is produced when said first excitation is applied and a relatively large output is produced when each of said second and third excitations are applied.

7. In a magnetic system, the combination comprising a plurality of magnetic elements each having two states of magnetization, a plurality of branch circuits each coupled to a different one of said elements, said branch circuits all being connected in parallel with the other, means for applying an excitation to all said elements in a direction to change said elements from one to the other of said states, and means to apply another excitation to one of said elements in a direction to change it from said other to said one state, said one element producing a signal in its branch circuit, and means to apply a further excitation to all said elements in a direction to change said elements from said other to said one state, the remaining ones of said elements producing another signal in that said branch circuit of said one element.

8. In a magnetic switching system, the combination comprising a plurality of magnetic elements each capable of assuming stable remanence conditions, a plurality of output windings, each of said output windings being linked to a different one of said elements, first, second, third and fourth junction points, said first and third junction points being electrically independent of each other, each of the output windings of certain ones of said elements being connected in parallel with one another between said first and second junction points, and each of the output windings of the remaining ones of said elements being connected in parallel with one another between said third and fourth junction points.

9. In a magnetic switching system, the combination comprising a plurality of individual magnetic cores each capable of assuming stable remanence conditions, a plurality of output windings, each of said output windings being linked to a different one of said cores, first, second, third and fourth junction points, said first and third junction points being electrically independent of each other, each of the output windings of certain ones of said cores being connected in parallel with one another between said first and second junction points, and each of the output windings of the remaining ones of said cores being connected in parallel with one another between said third and fourth junction points.

10. In a magnetic switching system, the combination comprising a plate of magnetic material having therein a plurality of apertures, each of said apertures defining a different one of a plurality of magnetic elements each capable of assuming stable remanence conditions, a plurality of output windings, each of said output windings being linked to a different one of said elements, first, second, third and fourth junction points, said first and third junction points being electrically independent of each other, each of the output windings of certain ones of said elements being connected in parallel with one another between said first and second junction points, and each of the output windings of the remaining ones of said elements being connected in parallel with one another between said third and fourth junction points.

11. In a magnetic switching system, the combination comprising a plurality of plates of magnetic material each having therein a plurality of apertures, said plates being stacked together with corresponding apertures therein being aligned with each other, each different group of said aligned apertures defining a different one of a plurality of magnetic elements each capable of assuming stable remanence conditions, a plurality of output windings, each of said output windings being linked to a different one of said elements, first, second, third and fourth junction points, said first and third junction points being electrically independent of each other, each of the output windings of certain ones of said elements being connected in parallel with one another between said first and second junction points, and each of the output windings of the remaining ones of said elements being connected in parallel with one another between said third and fourth junction points.

12. In a magnetic system, the combination of first and second pairs of magnetic elements, each of said elements having two remanent states, separate first excitation means each linking both elements in a different one of said pairs, separate second excitation means each linking a different element in each of said pairs, a separate output for each element, separate first and second parallel circuits, said first parallel circuit including said outputs of said first pair of elements, said second parallel circuit including said outputs of said second pair of elements, means for selecting a desired one of said elements comprising means for applying in sequence an excitation to that one of said first excitation means linked to said pair including said desired element, and means for applying another excitation to that one of said second excitation means linked to said desired element.

13. In a magnetic system, the combination of first and second pairs of magnetic elements, each of said elements having two remanent states, separate first excitation means each linking both elements in a different one of said pairs, separate second excitation means each linking a different element in each of said pairs, a separate output for each element, separate first and second parallel circuits, said first parallel circuit including only said outputs of said first pair of elements, and said second parallel circuit including only said outputs of said second pair of elements.

14. In a magnetic switching system, the combination comprising a plurality of magnetic elements each capaable of assuming stable remanence conditions, a plurality of output windings, each of said output windings being linked to a different one of said elements, first, second, third and fourth conductors, said first and third conductors being electrically independent of each other, each of the output windings of certain ones of said elements being connected in parallel with one another between first and second conductors, and each of the output windings of the remaining ones of said elements being connected in parallel with one another between said third and fourth conductors.

15. In a magnetic system, the combination comprising magnetic elements each having two remanent states, and each having a separate output, a first excitation means linked to all said elements, said first excitation means linking a first plurality of said elements in one sense and another plurality of said elements in the opposite sense, the outputs of said first plurality of elements being connected in parallel with each other, the outputs of said other plurality of elements being connected in parallel with each other, and a plurality of second excitation means, each of said second excitation means being linked to a different one of said elements, said first and second excitation means linking any one of said elements in opposite senses.

16. A magnetic system comprising a plurality of magnetic elements each having two remanent states, a first winding means linking certain of said elements in one sense and the remaining ones of said elements in the opposite sense, a plurality of output windings, each of said output windings being linked to a different one of said elements, means connecting each of said output windings of said certain elements in parallel with each other, means connecting said output windings of said remaining elements in parallel with each other, and a plurality of second winding means, each of said second winding means being linked to a different one of said elements.

17. A magnetic system comprising first and second groups of magnetic elements, each having two remanent states of magnetization, one of said elements being common to both said groups and others of said elements not common to both said groups, a separate output for each element, means connecting the said outputs of the elements of one of said groups in parallel with each other, and means for applying excitation signals to all the elements in both said groups, said excitation signals being applied sequentially to each of said groups and being of opposite polarity.

18. A magnetic system comprising a plurality of magnetic elements each having two remanent states of magnetization and each requiring a threshold excitation before changing from one to the other of said states, first and second excitation means each linking a different group of said elements, one of said elements being common to both said groups and others of said elements not common to both said groups, a separate output for each element, means connecting the said outputs of the elements of one of said groups in parallel with each other, and means for applying excitations to all the elements in both said groups, said excitations being applied sequentially to each of said groups and of opposite polarity, and each of said applied excitation exceeding said threshold excitation.

19. A magnetic system comprising a plurality of magnetic elements arranged in rows and columns, said elements each capable of assuming stable remanence conditions, a plurality of first excitation means each linking the elements of a different row, a plurality of second excitation means each linking the elements of a different column, first and second magnetic switches each having a plurality of output windings and each having means for selecting a desired one of said output windings, a first pair of junction points, each of said first excitation means being connected in series with a different one of said first switch output windings between said first pair of junction points, a second pair of other junction points, each of said second excitation means being connected in series with a different one of said second switch output windings between said second pair of junction points, a plurality of outputs each linking a different one of said elements, and all the said outputs of the elements of any one of said rows being connected in parallel with each other.

References Cited in the file of this patent

UNITED STATES PATENTS

| | | |
|---|---|---|
| 2,708,267 | Weidenhammer | May 10, 1955 |
| 2,719,773 | Karnaugh | Oct. 4, 1955 |
| 2,719,961 | Karnaugh | Oct. 4, 1955 |
| 2,719,962 | Karnaugh | Oct. 4, 1955 |
| 2,724,103 | Ashenhurst | Nov. 15, 1955 |
| 2,729,807 | Paivinen | Jan. 3, 1956 |
| 2,734,185 | Warren | Feb. 7, 1956 |
| 2,784,391 | Rajchman | Mar. 5, 1957 |